United States Patent [19]

Francisco et al.

[11] Patent Number: 5,875,433
[45] Date of Patent: *Feb. 23, 1999

[54] POINT OF SALE TAX REPORTING AND AUTOMATIC COLLECTION SYSTEM WITH TAX REGISTER

[75] Inventors: Paul A. Francisco, Loch Arbour; Frederick J. Petschauer, Belmar, both of N.J.

[73] Assignee: TaxNet Systems, Inc., Spring Lake, N.J.

[*] Notice: The term of this patent shall not extend beyond the expiration date of Pat. No. 5,799,283.

[21] Appl. No.: 726,928

[22] Filed: Oct. 7, 1996

Related U.S. Application Data

[63] Continuation-in-part of Ser. No. 438,890, May 10, 1995, Pat. No. 5,799,283.

[51] Int. Cl.⁶ .................................................. G06F 17/60
[52] U.S. Cl. ............................................... 705/26; 705/19
[58] Field of Search ................................. 705/19, 26, 16

[56] References Cited

U.S. PATENT DOCUMENTS

| | | |
|---|---|---|
| 3,267,438 | 8/1966 | Berler . |
| 3,281,794 | 10/1966 | Townsend . |
| 3,294,960 | 12/1966 | Townsend . |
| 3,944,801 | 3/1976 | Montana . |
| 3,946,217 | 3/1976 | Tsujikawa et al. . |
| 3,963,910 | 6/1976 | Enomoto et al. . |
| 4,144,567 | 3/1979 | Tadakuma et al. . |
| 4,430,713 | 2/1984 | Nakatani et al. . |
| 4,503,503 | 3/1985 | Suzuki . |
| 4,630,292 | 12/1986 | Juricich et al. . |
| 4,727,243 | 2/1988 | Savar . |
| 4,762,587 | 8/1988 | Deal . |
| 4,890,228 | 12/1989 | Longfield . |
| 5,138,549 | 8/1992 | Bern . |
| 5,193,057 | 3/1993 | Longfield . |
| 5,335,169 | 8/1994 | Chong . |
| 5,366,404 | 11/1994 | Jones . |
| 5,644,724 | 7/1997 | Cretzler ........................... 705/19 |
| 5,774,872 | 6/1998 | Golden et al. ................... 705/19 |

*Primary Examiner*—Edward R. Cosaimano
*Assistant Examiner*—Barton L. Bainbridge
*Attorney, Agent, or Firm*—Joseph A. Rhoa

[57] ABSTRACT

A point of sale tax reporting and automatic collection system including a smart tax register located at a retailer location. The retailer smart register processes consumer transactions and calculates the amount of sales tax due the retailer by the consumer for each transaction. Following the transaction, the consumer requests and is give a tax paid receipt. After the sales tax is paid to the retailer by the consumer, the register either immediately or periodically forwards the amount of the transaction and the amount of sales tax collected by the retailer to a computer and memory located at a remote location (e.g. state government taxing authority). The computer and memory receive and store the retailer's transaction and sales tax information, and report same to the Internal Revenue Service at least once a year. After receiving the retailer's sales tax information, the computer accesses and debits an account belonging to the retailer, the amount debited corresponding to the amount of sales tax collected by the retailer. In sum, the system automatically reports all retailer transactions and sales tax collected by retailers from consumers to local and federal government authorities and then automatically collects the sales tax amounts from retailer accounts so as to prevent retailers from turning over the collected sales tax. A tax paid receipt is given to each consumer as evidence that the tax paid will be turned over to the proper authorities.

4 Claims, 7 Drawing Sheets

POINT OF SALE - TAX REPORTING AND
AUTOMATIC COLLECTION SYSTEM

CUSTOMER RECEIPT
FROM SMART
REGISTER

RETAILER NAME
LOCATION
PHONE #
SALES TAX ID #

STATE
OWNED
INDICIA
AUTHENTICATES
TRANSACTION

AMOUNT OF SALE $XXXXX — 53
TAX COLLECTED $XXXXX — 55
TRANSACTION #XXXXXXXX — 57

TO VERIFY YOUR
TRANSACTION CALL
1-800-9999

(follow menu instructions)

POINT OF SALE TAX REPORTING AND AUTOMATIC COLLECTION SYSTEM WITH TAX REGISTER

This application is a continuation-in-part of Ser. No. 08/438,890, filed May 10, 1995, now U.S. Pat. No. 5,799,283.

This invention relates to a system for automatically forwarding retail sales transaction information and corresponding sales tax data from individual retailers to a centrally located remote location such as a government taxing authority using a tax register. More particularly, this invention relates to a system and method for ensuring that substantially all retail transactions upon which sales tax is collected are reported to and collected sales tax is paid over to government authorities for subsequent annual tabulation and submission to the IRS, the system and method utilizing a tax register disposed at each retail location and central computers and memories disposed at state and federal offices.

BACKGROUND OF THE INVENTION

The tax laws in the United States are set up so as to require retailers throughout the country to report all transactions made with consumers. For example, each time an appliance retailer sells a refrigerator or television to a consumer, the retailer is required to report the transaction and the amount of sales tax collected to state and/or federal government authorities for tax purposes. Unfortunately, many retailers (e.g. appliance stores, restaurants, furniture stores, automobile dealers, tour services, computer venders, etc.) do not report each and every cash transaction made with consumers to the state and/or federal governments, either intentionally or unintentionally. By not reporting all (e.g. cash) transactions, retailers avoid declaring their actual total gross income in their federal and state income tax returns thus putting themselves in a position to keep the sales tax collected from consumers on such transactions for their own enrichment.

Most states throughout the United States have legislated a percentage based sales tax on retail goods sold to consumers. Sales tax rates and the items taxed vary from state to state. In most states, a Certificate of Authority is issued by the state government to retail establishments, this certificate authorizing retailers to collect sales tax from public consumers and then, in turn, pay over all collected sales tax proceeds to the state treasury. When cash transactions occur or inadequate records are kept, retailers sometimes fail to report the transactions and do not turn over the sales tax collected thereon. This, of course, adds up to a significant loss for state and federal treasuries as more and more retailers accidentally forget or neglect to report transactions and turn over the resulting collected sales tax.

Currently, most individual states employ numerous auditors whose job it is to monitor and enforce proper reporting of sales tax transactions and the corresponding turning over of sales tax collected by retailers to the state treasury. Such auditors travel from retailer to retailer thereby visiting numerous retailer establishments at which the auditors "check the books and records" of the retailers for error (intentional or unintentional). In the event that an unreported cash transaction occurs or the paperwork is unavailable, the unreported transaction is undetectable and the auditor is at a loss to enforce the particular tax laws at issue.

Currently, tax laws and retailers are set up so that retailers typically charge the required sales tax in most consumer transactions. Generally, retailers are collection agents for the government who collect, hold, and use for extended periods of time collected tax money which belongs to the government. However, consumers and state taxing authorities have no way to verify that all transactions made by the retailer and sales tax dollars collected thereon are reported to the state treasuries. In other words, retailers are currently on an "honor system" requiring them to report all retail sales to the proper authorities and pay over the corresponding sales tax amounts collected thereon. Unfortunately, as with all "honor systems", the reporting of some transactions goes unreported, either intentionally or unintentionally, thereby resulting in both retailer unjust enrichment and tax law unenforceability. The consumer has no way of knowing if the collected sales tax is being turned over to the appropriate authorities.

It is apparent from the above that there exists a need in the art for a system and corresponding equipment and method to be implemented which increases the percentage of retailer transactions and collected sales tax forwarded to state and federal government agencies. By ensuring that a larger percentage of retail transactions are reported to taxing authorities and that a greater amount of the overall sales tax collected by retailers is paid over to state treasuries, local and federal economies can be more efficiently run and a lesser number of violators will slip through the cracks. It is also desirable that such a system and method have the flexibility for adaptation to other types of taxing of goods and services such as, but not limited to, a potential value added tax system.

U.S. Pat. No. 5,335,169 discloses a system for tracking multiple rate assessments on transactions. The '169 patent discloses a computerized system for tracking multiple rate assessments on transactions with customers of a user of the system and includes a computer having a processing unit, memory storage, input, display, and other programmable devices. The object of the '169 patent is to implement a system capable of automatically tracking appropriate sales tax rates, sales types, and taxing jurisdictions for the user based upon a limited set of transaction designations. While the system of the '169 patent enables the user to keep track of appropriate sales tax rates, sales types, etc., the system does not act to ensure that all retailer transactions and sales tax collected thereon are reported and forwarded to the appropriate authorities.

U.S. Pat. No. 5,138,549 discloses an automated tax deposit processing system for automatic processing of payroll, corporate profit, and excise taxes. A depositor, via a computer link, engages in a question and answer exchange with one of a multiple number of voice synthesizers connected to a processor, in accordance with the '549 patent. Through the exchange, the depositor enters tax deposit information which the processor stores in its memory. At the end of a particular time period, the processor stores tax deposit information relating to tax deposits due the same day on a storage medium in format(s) predefined by the government agency. The processor also stores tax deposit information entered during the specified time period on a second storage medium so as to enable a bank to automatically transfer tax deposits from each depositors account to a bank account. The system of the '549 patent also includes remote communication terminals connected by links to the processor through which information on depositors and tax deposit due dates is entered. While the system of the '549 patent decreases lobby traffic in banks and personnel time involved in accepting and processing tax deposits, it does not function as does the instant system and method to automatically ensure that substantially all retail transactions and sales tax collected thereon are automatically reported and forwarded to the appropriate state and/or federal authorities.

U.S. Pat. No. 4,144,567 discloses an electronic register which enables tax-calculating data to be stored in a memory. In a registration mode, amounts of articles bought by a customer or consumer are stored in the memory of an electronic circuit to calculate a total amount of all articles sold. The total amount calculated is printed on a receipt and a journal sheet. In a tax set mode, tax data showing the relationship between a taxable amount and a tax assessable thereon is stored in a tax data memory by operation of an entry key and tax key. Tax determined is stored in a buffer register so that after calculation of a tax by the tax calculation circuit, a print instruction is given which impresses the calculated tax stored in the buffer register. Later, the contents of the buffer and those of the sales amount memory are added together and stored in a memory. While the register of the '567 patent discloses a useful register for retailers, it does not act to automatically or ensure that all retail transactions and sale tax collected thereon are reported and forwarded to the appropriate authorities.

Conventionally, sales taxes are collected when goods are purchased and delivered into the same State (e.g. New Jersey). "Use tax" is supposed to be paid by buyers when same take delivery by parcel post in the buyer's home state (i.e. across state lines). Unfortunately, buyers often do not pay the required "use tax" given such circumstances. For example, if a buyer purchased a computer from a company in New York and it was shipped to Virginia, via UPS, the seller would not collect New York sales tax. However, the buyer is legally obligated to go to the Virginia Tax Office and pay a six percent (6%) use tax to the State of Virginia. Millions, and possibly billions, of dollars are lost annually in unpaid "use tax". This problem is magnified in situations where sales are made via the Internet and the like.

It is a purpose of this invention to fulfill the above-described needs, as well as other needs apparent to the skilled artisan from the following detailed description of this invention.

SUMMARY OF THE INVENTION

Generally speaking, this invention fulfills the above-described needs in the art by providing a point of sale tax reporting system comprising:

at least one (but possibly many) tax register located at a retailer location, the at least one tax register for processing consumer sales transaction data at the retailer location and computing sales tax data to be paid to the retailer by the consumer based on the amount of a sale, the at least one tax register forwarding the transaction data and the sales tax data to a first remote location;

a printer located at the retailer location and in communication with the at least one tax register, the printer for printing consumer receipts, the receipts having listed thereon the computed sales tax paid to the retailer by the consumer;

a first computer and corresponding first memory disposed at the first remote location, the first computer and memory for receiving and storing the forwarded transaction and sales tax data; and a first communication link connecting the tax register at the retail location to the first computer and memory at the first remote location, the first communication link for permitting the register to forward the transaction and sales tax data to the first computer and memory whereby the transaction and sales tax data from the retailer is stored at the first remote location in order to help enforce tax laws and prevent retailers from avoiding the payment to the government of collected sales tax.

In certain further preferred embodiments of this invention, the first computer periodically accesses and debits an account of the retailer, the amount debited corresponding to the amount of sales tax paid to the retailer by consumers, the system thereby automatically debiting the retailer's account in accordance with the sales tax data computed and forwarded to the first computer by the register.

This invention further fulfills the above-described needs in the art by providing a method of automatically reporting sales tax paid by consumers to a retailer, the method comprising the steps of:

the consumer purchasing a good or service from the retailer;

a retailer register calculating the base sales cost and the corresponding sales tax owed the retailer by the consumer;

the retailer collecting the calculated sales tax from the consumer;

the register printing a consumer receipt using a printer, the consumer receipt having listed thereon the amount of sales tax paid to the retailer by the consumer;

the register forwarding as sales tax data the amount of sales tax paid to the retailer by the consumer to a first computer located at a first remote location;

the first computer receiving and storing the sales tax data in a first memory at the first remote location; and repeating the above steps so that the first memory is periodically updated with sales tax data from the retailer whereby the amount of sales tax paid to the retailer by consumers is stored and summed by the computer at the first remote location.

In certain further preferred embodiments of this invention, the above method further comprises the step of the first computer automatically debiting a retailer account an amount corresponding to the sales tax data forwarded by the register whereby the sales tax paid to the retailer by the consumer is automatically collected from the retailer's account by the first computer.

This invention further fulfills the above-described needs in the art by providing a method of reporting and collecting sales tax paid to retailers by consumers, the method comprising the steps of:

a retailer pre-paying a government office a predetermined amount of sales tax to be collected from consumers, the amount of sales tax not yet having been collected by the retailer;

the government office crediting a declining register an amount corresponding to the amount prepaid by the retailer; and the retailer using the credited declining register to print a consumer receipt for each retailer-consumer transaction upon which sales tax is paid, the consumer receipts having printed thereon the amounts of sales tax collected by the retailer from the consumer.

For retail operations such as restaurants where tips are customary, the tax register may be programmed to accept and report tip information.

This invention will now be described with reference to certain embodiments thereof as illustrated in the following drawings.

IN THE DRAWINGS

FIG. 2 illustrates a consumer receipt to be printed from a retailer register according the first embodiment of this invention.

DETAILED DESCRIPTION OF CERTAIN EMBODIMENTS OF THIS INVENTION

Figure 1:
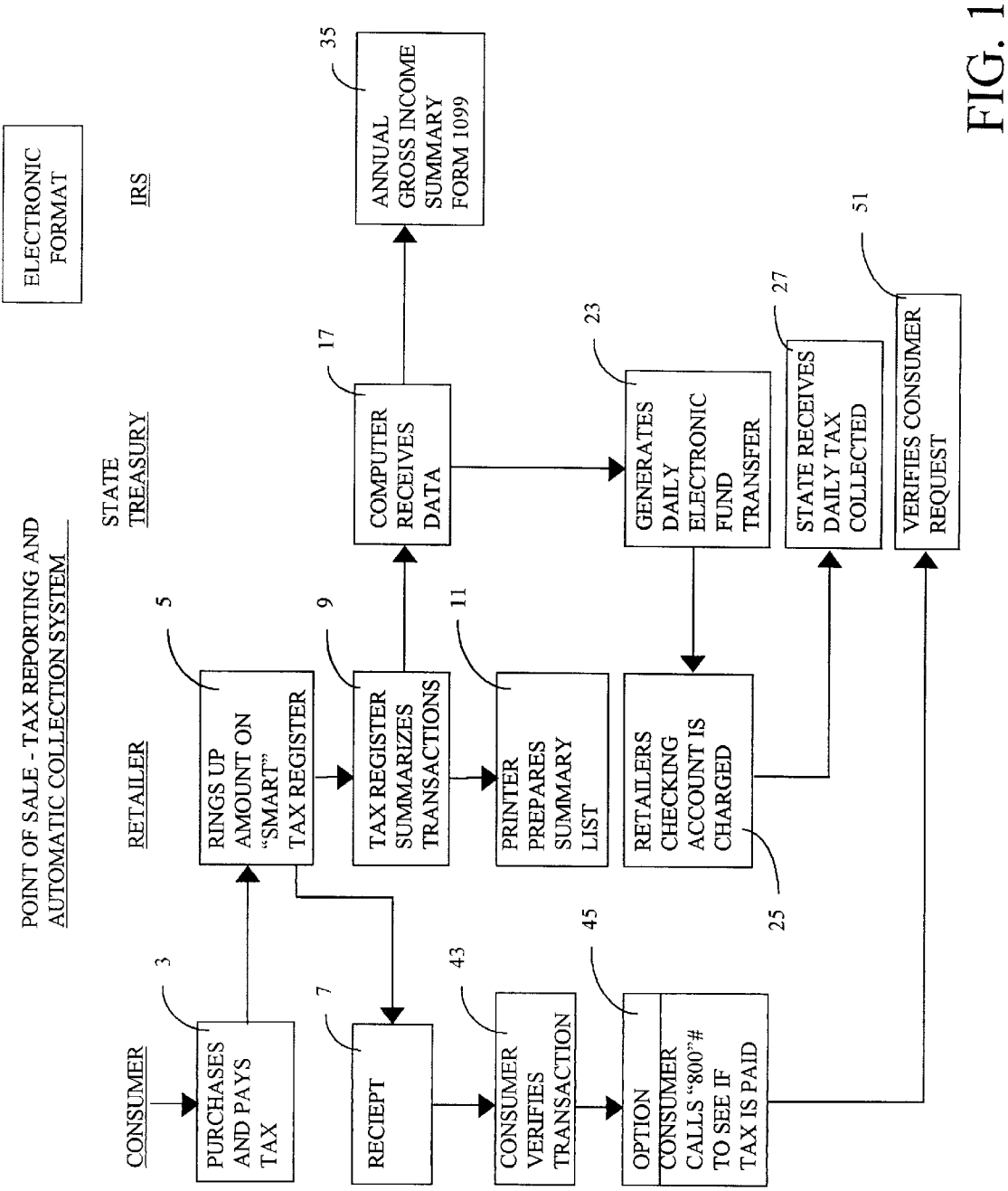
FIG. 1 is a block diagram flow chart of an electronic point of sale tax reporting and automatic collection system according to a first embodiment of this invention.

Referring now more particularly to the accompanying drawings in which like reference numerals indicate like parts and steps throughout the several views.

Figure 3:
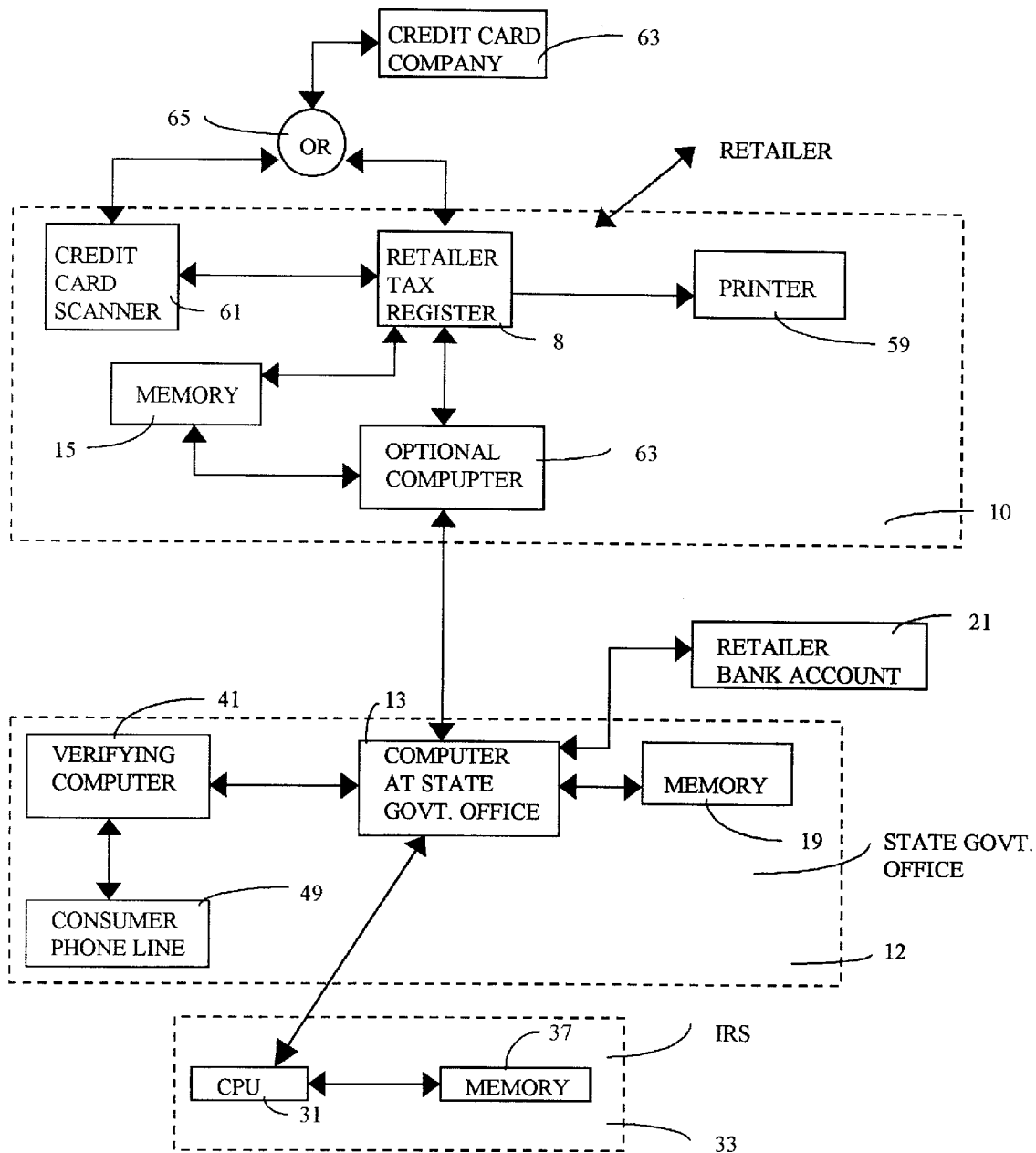
FIG. 3(a) is a block diagram of components of the system according to the first embodiment of this invention set forth in FIGS. 1–2.
FIG. 3(b) is a flow chart illustrating a way in which the retailer register of the first embodiment may process and forward retailer transactions and collected sales tax data to a government office.

FIG. 1 is a block diagram/flow chart of an electronic point of sale tax reporting and automatic collection system according to a first embodiment of this invention. The system and method as set forth in FIGS. 1–3 begins at retailer location 10 with the consumer at step 3 where the consumer purchases an item (good or service) from the retailer and pays the appropriate sales tax due on the transaction. When the consumer brings an item to be purchased to retailer checkout register 8, the retailer rings up the sale amount in step 5 by way of the register. Register 8 in step 5 calculates the total sale amount including the cost of the good or service being purchased and the sales tax due on the transaction. The retailer informs the consumer of the total cost of the transaction and the consumer subsequently pays both the sales price and the sales tax due to the retailer. After the retailer is paid, the retailer issues receipt 6 (see FIG. 2) to the consumer in step 7. Consumers are educated regarding the importance of asking for receipt 6 so as to ensure that the retailer documents and reports the collected sales tax.

Register 8, which may be a combination conventional programmable electronic cash register and tax register, or alternatively a conventional electronic cash register connected to a separate and independent programmable electronic tax register, processes and summarizes each transaction in step 9. In summarizing each transaction, register 8 processes the total amount of money received by the retailer from the consumer, this including the sales tax collected and the base transaction amount. Periodically, at the end of each day for example, register 8 causes a printer to output a summary list of all transactions in step 11, this list including a summed total of sales tax collected by the retailer as well as a sum total of base transaction money received from consumers by the retailer.

For example, register 8 may be a tax-modified (via chip, hardware, and/or software technology) Omron Vantage 7000 PC-based point-of-sale system which is a turnkey hardware solution built around an upgradeable 486SX 25 MHZ processor. The system has a POS keyboard with integrated credit card reader and bar code decoder, receipt printer, VGA monitor, and cash drawer. The software may be modified to perform the tax and retail tasks set forth herein.

Retailer register 8 is in communication with computer 13 which is disposed at remote location 12 as set forth in FIG. 3(a). Any type of conventional communication link (e.g. satellite, phone line, T1, microwave, fiber optic, etc.) may be disposed between register 8 and computer 13. Computer 13 may, for example, be located at a state treasury office or other state government taxing authority. Register 8 forwards the amount of sales tax collected by the retailer to computer 13. Register 8 may either forward such sales tax data to computer 13 at the end of or during each transaction, or alternatively it may sum sales tax collected and base transaction amounts collected and store them in memory 15 and then periodically (e.g. at the end of each day) output the summed totals to computer 13 in accordance with its programmed instructions.

Computer 13 receives the forwarded sales tax data and optionally the base transaction data from retailer register 8 in step 17 and stores this information in memory 19, memory 19 preferably being located at the same remote location 12 as computer 13. After computer 13 receives and stores the tax and transaction data, it accesses retailer bank account 21 in steps 23 and 25 for the purpose of debiting account 21 an amount equal to the sales tax collected by the retailer from consumers (e.g. debit the amount collected the previous day). Computer 13 may access retailer bank account 21 periodically (e.g. on a daily basis), or alternatively after or during each sales transaction recorded and/or processed by register 8, this, of course, depending upon whether register 8 is forwarding the transaction and sales tax data to computer 13 in a periodic or immediate real time manner.

For retail operations where tips are customary the tax register 8 may be programmed to accept and report tip information to location 12. Accordingly, collected tip money is automatically reported to the taxing authorities.

After computer 13 accesses retailer bank account 21 in step 23, the account is charged in step 25 an amount corresponding to the retailer tax data received from register 8 by computer 13 and stored in memory 19. By accessing a bank or checking account of the retailer, the remote location 12 (e.g. state taxing authority) automatically receives from retailer account 25 in step 27 the amount of sales tax collected by the retailer thereby preventing the retailer from unintentionally not turning over the collected tax to the appropriate authorities. Retail register 8 thus is caused to automatically report all sales transactions and sales tax collected by the retailer to computer 13 and memory 19. When remote location 12 receives such transaction and sales tax data, it accesses retailer bank account 21 and causes the account to be debited an amount corresponding to the sales tax collected by the retailer. Conventional electronic fund transfer techniques may be utilized to debit retailer account 21.

Computer 13 is also in communication with CPU 31 via any type of conventional communication link. CPU 31 is preferably located at another remote location 33, which is representative of the Internal Revenue Service (IRS) according to certain embodiments of this invention. Computer 13 summarizes and forwards all annual transaction data, and optionally sales tax data, to CPU 31 so that the IRS receives such information in step 35. Accordingly, the IRS is informed (via Form 1099) of the retailer's annual total gross income thereby ensuring that the retailer efficiently and automatically declares all transactions for tax purposes. CPU 31 is in communication with memory 37 so that consumer transaction and sales tax data can be stored at the IRS in memory 37 for later access. It is noted that local area networks (LANs) may be provided at locations 10, 12, and 33 thereby allowing the system to efficiently and quickly function via conventional computer communication techniques.

Conventional electronic data interchange (EDI) technology or network centric computing may be used for the purpose of allowing register 8 to communicate with computer 13. Network centric computing allows the taxing authorities to record and collect the tax electronically. EDI is a known means of electronically exchanging information in a standard format from one computer to another. EDI is easily implemented in mainframe, minicomputer, PC, and LAN environments. Using EDI, documents and/or other data are transferred from the sender's computer mailbox to that of the recipient, such documents or information (e.g. transaction data, sales tax data, etc.) being either sent directly or through a value-added network (VAN). Value-added networks are typically third party provisions offering fee-based services such as connections and protocol (e.g. TCP/IP) conversions, such networks routing each transaction to the appropriate electronic mailbox where the information stays until the other party downloads. Thus, EDI may be used as a way in which it allows register 8 to forward all of its transaction and sales tax data to computer 13 located at the remote site 12. As will be recognized by those of skill in the art, EDI may also be utilized between computer 13 and CPU 31 so as to simplify and efficiently manage the communication networks according to the different embodiments of this invention.

An optional feature of this embodiment is the provision of verifying computer 41 at location 12 for the purpose of allowing consumers and/or other interested parties to verify that particular retailer transaction(s) were reported to locations 12 and 33 (e.g. state taxing authority and IRS respectively). For example, a consumer may verify in step 43 that his or her transaction was reported by the retailer to the appropriate authorities is by calling an 800 number in step 45. The 800 number provides the consumer access to verifying computer 41 by way of telephone line 49 so that via conventional DTMF coding technology the consumer can request verification in step 51 that a particular transaction(s) has, in fact, been reported.

FIG. 2 illustrates an exemplary receipt 6 which may be provided to the consumer from the retailer in step 7, receipt 6 being printed by retailer printer 59. As shown, customer or consumer receipt 6 has listed thereon the base sale amount 53, the amount of sales tax collected on the base transaction 55, and optionally a transaction number 57. Although not shown, the total transaction cost may also be printed on the receipt, with the base transaction amount 53 and the sales tax collected 55 being summed together by register 8 to come up with the total amount of the transaction. Optionally listed on the receipt is a telephone number which allows consumers to access verifying computer 41 in order to confirm that particular transactions (identified by transaction number 57) have been reported to the appropriate authorities as set forth above.

Retailer location 10, as illustrated in FIG. 3(a), includes retailer register 8, memory 15, printer 59, credit card scanner 61, and optionally computer 63. Retail register 8, made up of one or more registers, is connected to printer 59, with the printer either being integrally formed with the register or remotely located therefrom at the retailer location. Printer 59 operates to print consumer receipt 6 in step 7 as well as to output summary lists of transaction and sales tax amounts for the retailer in step 11.

Conventional memory 15 is provided so that retailer register 8 can store and optionally sum base transaction amounts 53, collected sales tax amounts 55, and total sale amounts (including the base transaction amount added to the receipt sales tax amount). Such transaction and sales tax data stored in memory 15 can then be periodically accessed by register 8 and forwarded to computer 13.

Conventional credit card scanner 61, which is either integrally formed with register 8 or separate and independent with respect thereto, is provided so as to allow consumers to pay the retailer at location 10 by way of credit or debit card in a known manner. Scanner 61 is in communication with credit card verifying source(s) 63 via conventional telephone line(s) so that scanner 61 may check input credit card numbers to ensure their validity. The "or" block 65 illustrated in FIG. 3(a) is provided SO as to illustrate the fact that if credit card scanner 61 is separate and independent from register 8, then scanner 61 is directly in communication with credit card verifying source 63, but when scanner 61 and register 8 are integrally formed as one unit the register (and scanner) is in communication with the verifying source 63.

Another optional feature according to this embodiment is the provision of computer 63 at retailer location 10. Depending upon the programmability of register 8, it may be necessary for a retailer to be provided with computer 63 for the purpose of processing base transaction costs, total costs, sales tax data, and/or storing and forwarding same to computer 13.

Although not illustrated, another option to this embodiment is the provision of a plurality of mainframe computers disposed throughout a state for example, such mainframes being connected between computer 13 and the numerous retailers 10 spread throughout the state. Each mainframe when provided is responsible for gathering tax data and consumer transaction data from retailers, sorting the information and forwarding same to computer 13 at location 12. In such a manner, the burden placed upon computer 13 with respect to receiving, sorting, and storing transaction and tax data would be lessened with the mainframes taking on much of this burden.

Figure 3B:
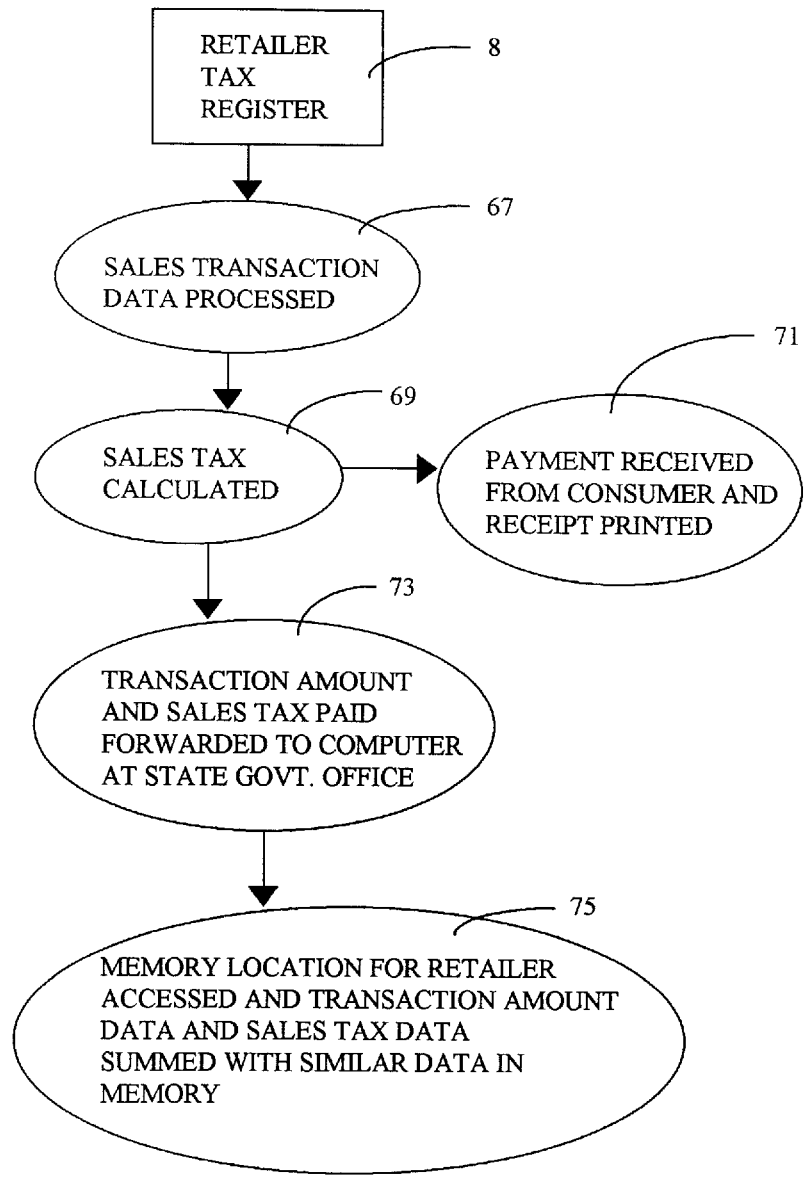

FIG. 3(b) is a flow chart illustrating steps taken by register 8 and computer 13. When a consumer purchases an item from a retailer, the sales transaction data is processed in step 67 and the sales tax calculated by register 8 in 69. After payment is received by the retailer from the consumer and receipt 6 is printed in step 71, the transaction amount (absent sales tax) and the sales tax paid on the transaction are each forwarded by register 8 to computer 13 in step 73, register 8 having PC capabilities according to certain embodiments.

After computer 13 receives the transaction amount data and sales tax data in step 73, computer 13 accesses the memory slot within memory 19 designated for the particular retailer identified. Computer 13 then causes the transaction and sales tax data to be summed with like data stored in that slot in step 75 so as to keep a running tabulation on the amount of sales tax and transaction fees collected by that particular retailer.

Figure 4:
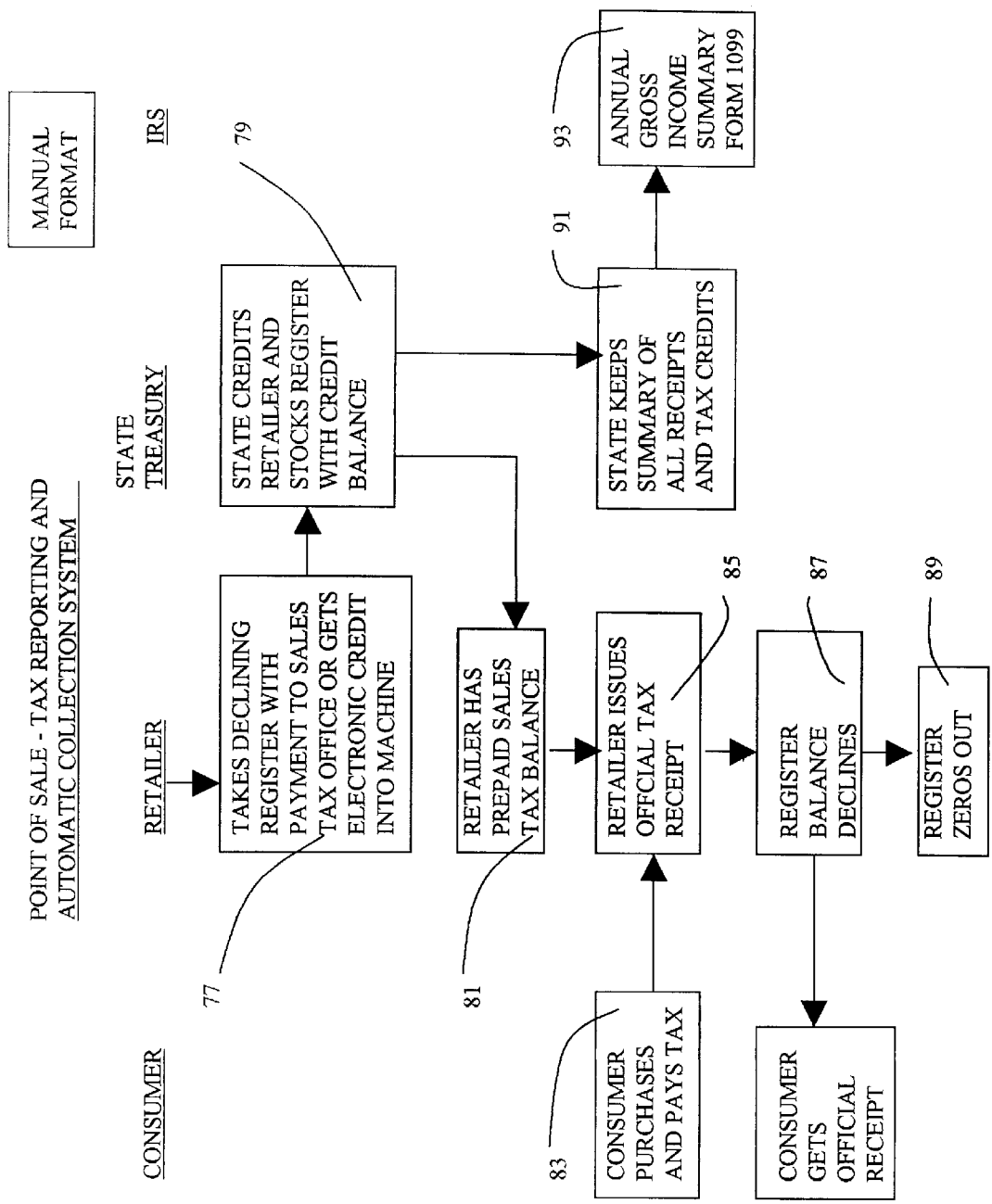
FIG. 4 is a block diagram flow chart of a manual point of sale tax reporting and collection system according to a second embodiment of this invention, this second embodiment utilizing a declining register to be used by the retailer in order to ensure efficient sales tax collection by government authorities.
Figure 5:
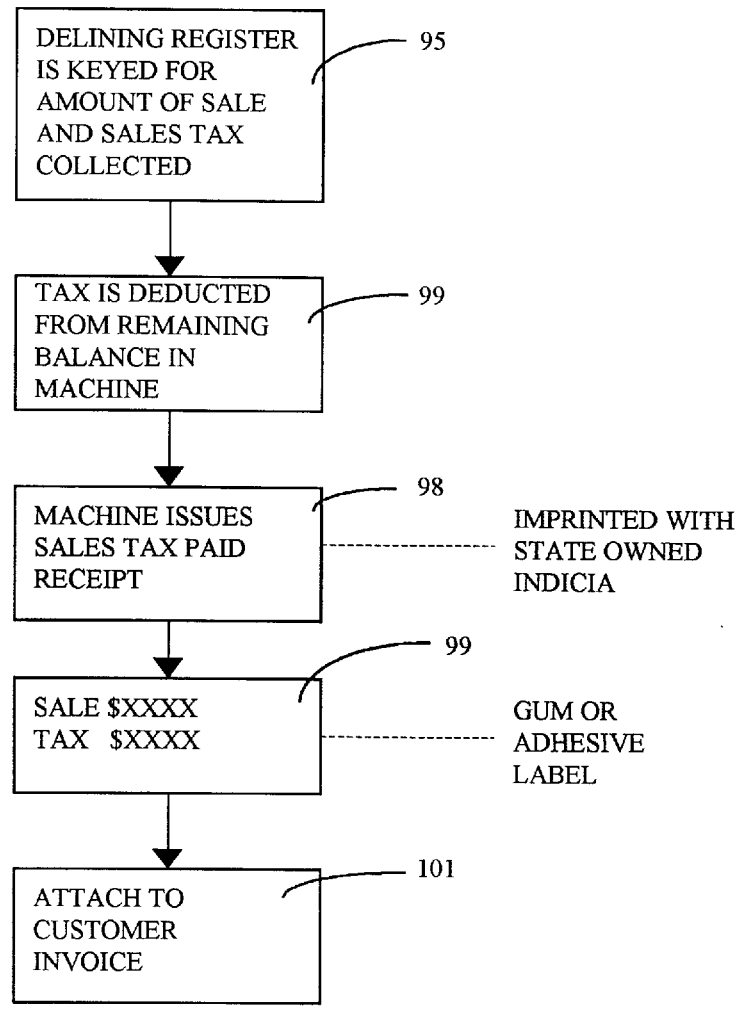
FIG. 5 is a flow chart according to the FIG. 4 embodiment to this invention, this Figure illustrating the manner in which the declining register operates in order to print consumer receipts indicating the amount of sales tax collected by the retailer from the consumer.

FIGS. 4–5 are block diagram/flow charts of a manual point of sale tax reporting and automatic collection system according to a second embodiment of this invention. According to this embodiment, a declining register, similar to a conventional Pitney-Bowes postage stamp meter, is utilized. The process begins in step 77 with the retailer taking its assigned declining register to a government sales tax office or electronic credit machine. At such an office or machine, the retailer pre-pays the state a particular amount of sales tax credit, with the state then in step 79 crediting and stocking the retailer's declining register with the amount pre-paid. Thus, the retailer leaves having prepaid a particular amount of sales tax in step 81, this amount not yet having been received by the retailer from consumers.

When a transaction occurs and a consumer purchases a particular item upon which sales tax is to be collected, the consumer pays the sales tax in step 83 and thereafter the retailer issues an official tax receipt in step 85. The declining register is used to "stamp" the amount of sales tax collected onto the receipt which is then given to the consumer. When the declining register prints the receipt, its balance declines in step 87 (as with conventional declining postage meters) until finally, after a plurality of consumer purchases and retailer receipts stamps, the register zeros out in step 89.

Thereafter, the retailer takes his declining register back to the sales tax office or electronic credit machine and repeats step 77 and those following. Each time a retailer's declining register is credited with a particular pre-paid sales tax amount, the state stores and keeps a summary of all credited receipts and tax credits in step 91. Therefore, both the state and the IRS are provided annually with the total sum of sales tax collected (i.e. credited) by each retailer in step 93.

FIG. 5 is a block diagram/flow chart which more particularly illustrates the steps taken by the retailer is using the declining register in the FIG. 4 embodiment of this invention. At every transaction upon which sales tax is to be paid, the declining register is first keyed for the particular sales tax collected on the base transaction amount in step 95. In accordance with conventional declining register devices, the sales tax amount is deducted from the remaining balance in the machine in step 97. The machine issues a sales tax paid receipt in step 98, this receipt being imprinted with a state owned indicia and indicating the amount of sales tax collected by the retailer from the consumer. Receipt 99, which may or may not also include the total sale amount and/or the base transaction amount, is attached to the consumer's invoice in step 101.

Figure 6:
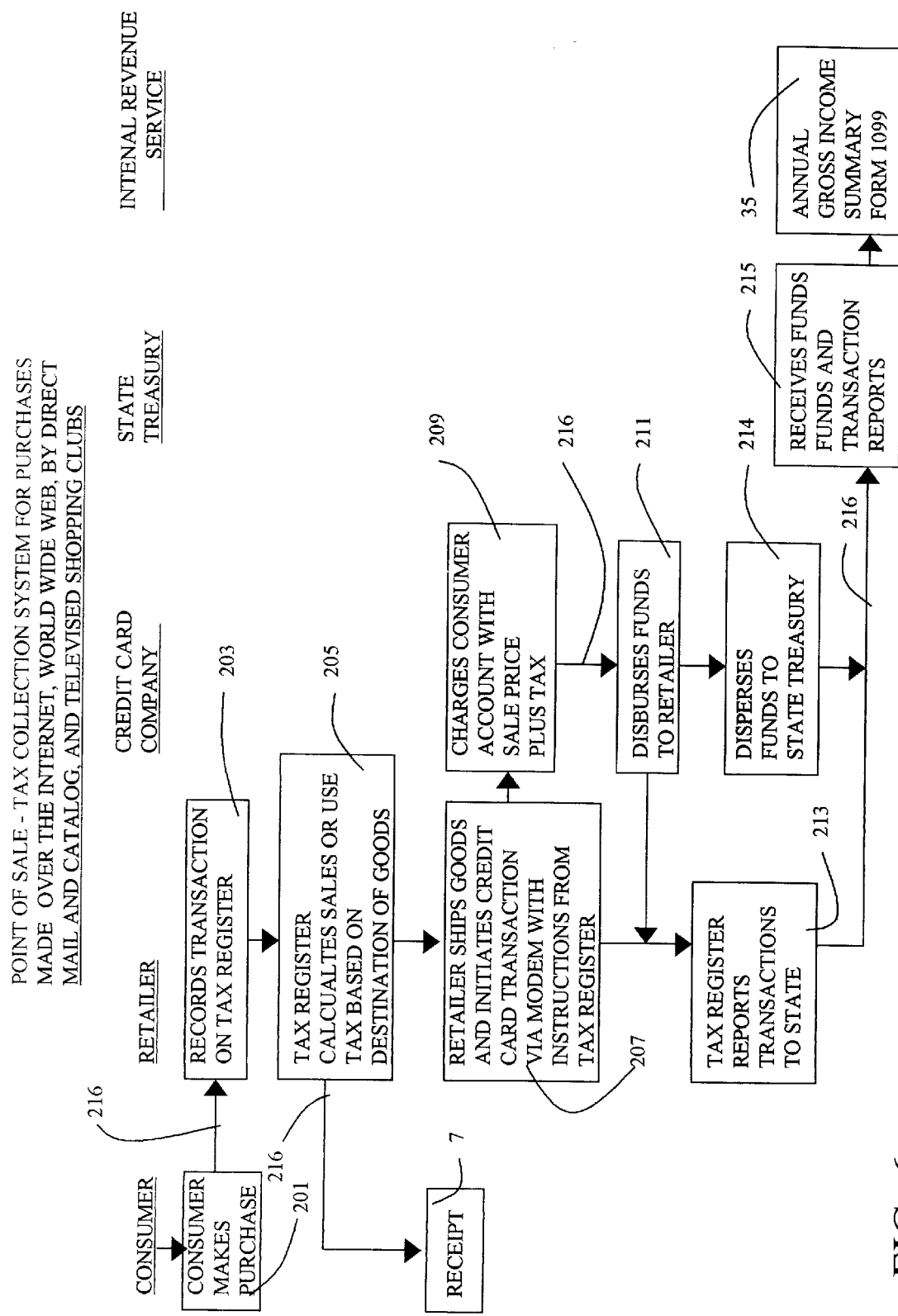
FIG. 6 is a flow chart/block diagram according to an embodiment of this invention wherein tax (e.g. "use tax") on sales made over the Internet, catalog, world wide web, direct mail, etc. is automatically charged to the buyer and reported to the IRS and forwarded to the appropriate State Treasury.

FIG. 6 is block diagram/flow chart according to an embodiment of this invention wherein tax (e.g. "use tax") on sales made over the Internet, catalog, world wide web, direct mail, etc. 216, is automatically charged to the buyer or customer, and reported to the IRS and forwarded to the appropriate State Treasury based on the location of the customer (i.e. where the goods are to be shipped). As shown in FIG. 6, when a buyer or customer wishes to purchase a product over the Internet 216, for example, the buyer or consumer first uses communication link 216 (e.g. packet switched digital data network) and makes the purchase at 201 (e.g. via direct mail, catalog order, Internet, etc.). After the consumer has made the purchase, the transaction (i.e. the purchase) is recorded on tax register 8 at the retailer location at 203. Thereafter, tax register 8 calculates the sales tax or "use tax" based on the destination of the goods at 205. For example, if the consumer or buyer is located in Virginia and the purchased goods are requested by the consumer to be shipped there from a New York retailer, tax register 8 at 205 calculates the Virginia use tax to be charged against the consumer's account or credit card. After this tax has been calculated at 205, the consumer is given a receipt 7 via the Internet, direct mail, or simply by regular U.S. Mail 216. After the tax has been calculated at 205, the retailer ships the purchased goods to the consumer and initiates a credit card transaction at 207, given the fact that the consumer has purchased the goods with a credit card. In step 207, tax register 8 instructs the system and coordinates the credit card transaction via a modem which is in communication with the credit card company. Thus, the credit card company at 209 charges the credit card of the consumer with both the sales price and the tax (e.g. use tax or just sales tax if the goods are not being shipped out-of-state).

Still referring to FIG. 6, after the credit card transaction has been completed, the amount of the sale is dispersed to the retailer at 211 via network 216 and tax register 8 reports the sales transaction to the State and/or IRS at 213. While tax register 8 reports to the State and IRS, the credit card company disperses the tax funds charged the consumer to the State and/or IRS at 214 via network 216. At 215, the appropriate State Treasury (e.g. Virginia) receives the tax calculated in step 205 over the Internet, modem, etc., while at step 35, the IRS receives the gross income summary form 1099 via network 216. Network 216 may be the Internet throughout the entire FIG. 6 system or, alternatively, may be partially the Internet (packet switched network) and otherwise via the public switched telephone network (PSTN) or the like.

In a manner consistent with FIG. 6, appropriate State and Federal Government Agencies automatically receive their tax information, including use tax and sales tax dollars, when consumers purchase goods or products over the Internet, via catalog, direct mail, televised shopping clubs, etc. 216 where enforcement of "use tax" payment is otherwise difficult given conventional systems. In sum, the FIG. 6 system is an improvement over the prior art which will permit governments to save large quantities of tax dollars, and will allow consumers and retailers to avoid costly tax preparation.

Once given the above disclosure, therefore, various other modifications, features, or improvements will become apparent to the skilled artisan. Such other features, modifications, and improvements are thus considered a part of this invention, the scope of which is to be determined by the following claims.

We claim:

1. A point of sale tax reporting system in an environment where a consumer purchases goods over a digital data network, the point of sale tax reporting system comprising:

at least one tax register located at a retailer location, said at least one tax register for processing consumer sales transaction data at the retailer location and computing use tax data to be paid to an appropriate state agency based upon the location of a consumer or where the purchased goods are to be shipped, said at least one tax register forwarding said transaction data and use tax data to the state agency;

a digital data network provided so as to connect the retailer location to a consumer location where the consumer is positioned, said digital data network for allowing the consumer to purchase goods from a retailer via said digital data network;

a first computer and corresponding first memory disposed at the state agency, the first computer and memory for receiving and storing the forwarded use tax data; and a first communication link connecting the tax register at the retailer location to the first computer and memory at the state agency, said first communication link for permitting the tax register to forward the use tax data to said first computer and memory whereby the tax data from the retailer is automatically forwarded to the state agency and stored in the first memory in order to help enforce tax laws and prevent consumers from avoiding the payment of use tax.

2. The point of sale tax reporting system of claim 1, wherein the first communication link is one of a digital packet switched network and a satellite network.

3. The system of claim 1, wherein the system includes means at the retailer location for accessing a credit card company in response to the transaction so that the credit card company automatically charges the consumer's credit card with both the sales price and a use tax based upon a destination to which the consumer requests that the purchased goods be shipped.

4. The system of claim 3, further including means for allowing the credit card company to forward use tax charged to the consumer to the state agency whereby the use tax, where appropriate, is automatically charged to the consumer.

* * * * *